(12) United States Patent
Nakano et al.

(10) Patent No.: US 7,406,115 B2
(45) Date of Patent: Jul. 29, 2008

(54) METHOD FOR EVALUATING SPREAD SPECTRUM RADAR AND SPREAD SPECTRUM RADAR

(75) Inventors: Masao Nakano, Kanagawa (JP); Etsuo Kakishita, Hyogo (JP)

(73) Assignees: Fujitsu Ten Limited, Kobe (JP); Fujitsu Limited, Kawasaki (JP)

( * ) Notice: Subject to any disclaimer, the term of this patent is extended or adjusted under 35 U.S.C. 154(b) by 562 days.

(21) Appl. No.: 11/073,842

(22) Filed: Mar. 8, 2005

(65) Prior Publication Data

US 2005/0195884 A1 Sep. 8, 2005

(30) Foreign Application Priority Data

Mar. 8, 2004 (JP) ............... P2004-064271

(51) Int. Cl.
*H04B 1/69* (2006.01)
*G01S 7/40* (2006.01)
*G01S 13/00* (2006.01)

(52) U.S. Cl. .................. 375/150; 342/173; 342/189

(58) Field of Classification Search ............ 375/130, 375/150; 342/70, 189, 82, 83, 85, 173, 188, 342/195; 708/5, 420
See application file for complete search history.

(56) References Cited

U.S. PATENT DOCUMENTS

| | | | | |
|---|---|---|---|---|
| 4,443,799 A | * | 4/1984 | Rubin | 342/201 |
| 5,724,041 A | * | 3/1998 | Inoue et al. | 342/70 |
| 6,760,363 B1 | * | 7/2004 | Bettaieb | 375/150 |
| 6,931,078 B2 | * | 8/2005 | McCorkle et al. | 375/295 |
| 2002/0181488 A1 | * | 12/2002 | Okazaki et al. | 370/441 |
| 2003/0058929 A1 | * | 3/2003 | Cox et al. | 375/150 |
| 2004/0196173 A1 | * | 10/2004 | Kuroda et al. | 342/82 |

FOREIGN PATENT DOCUMENTS

JP   B2 2580885   11/1996

\* cited by examiner

*Primary Examiner*—Mohammad Ghayour
*Assistant Examiner*—Lawrence B Williams
(74) *Attorney, Agent, or Firm*—Oliff & Berridge, PLC

(57) ABSTRACT

A spread spectrum radar performs a target detection process in a first mode. The target detection process includes performing a slide unit detection a plurality of times while sliding transmission code by predetermined number of chips. The slide unit detection includes transmitting the transmission code and performing a sliding-correlation calculation between the transmission code and a reception code. A method for evaluating the spread spectrum radar includes when the spread spectrum radar is changed to a second mode, which is different from the first mode, stopping the slide unit detection to be performed subsequently to the slide unit detection being performed at a time of changing to the second mode; and transferring a data group that indicates sliding correlation values obtained in the slide unit detection being performed at the time of changing to the second mode.

6 Claims, 9 Drawing Sheets

FIG. 3A REPEATING PROCESS
FIG. 3B POWER AVERAGING
FIG. 3C SLIDING + VOLTAGE AVERAGING
FIG. 3D A/D SAMPLING TIMING (1)
FIG. 3E A/D SAMPLING TIMING (2)

METHOD FOR EVALUATING SPREAD SPECTRUM RADAR AND SPREAD SPECTRUM RADAR

BACKGROUND OF THE INVENTION

1. Field of the Invention

The present invention relates to a method for evaluating a spread spectrum radar; that is, a method for evaluating performances and functions of a radar of a spread spectrum type, and more particularly relates to a static evaluation method.

2. Description of the Related Art

A spread spectrum radar measures a distance to a target as follows. The radar modulates a carrier with a transmission code into a transmission signal to spread the carrier; despreads a reception code having been reflected by the target, to thus obtain a reception code; and determines the distance to the target on a basis of a correlation value between the transmission code and the reception code.

In development of such a spread spectrum radar, it is indispensable to evaluate the performances and functions of the radar. At a time of shipment of such a spread spectrum radar from a factory to a user, it is also important to conduct an evaluation test of the performances and functions of the radar.

Since the evaluation described above is performed in a state where a measuring subject (i.e., a target) is at rest, such an evaluation is referred to as a "static" evaluation. In contrast, an "active" state corresponds to a normal operation mode in which the spread spectrum radar measures a distance while tracking a vehicle running ahead of the spread spectrum radar.

Meanwhile, Japanese Patent No. 2580885 discloses evaluating a device of a spread spectrum communication system.

An evaluation device of the direct spread communication system disclosed in Japanese Patent No. 2580885 provides a solution for problems that a conventional method for evaluating a device of a direct spread communication system requires high electric power, and that the evaluation device is increased in size.

SUMMARY OF THE INVENTION

In a spread spectrum radar, a "sliding correlation calculation" process is one of the important processes for measuring a distance. In the sliding correlation calculation process, while sliding a pattern of the transmission code by one bit at a time sequentially without changing the pattern of the transmission code, a correlation value between a transmission code and a reception code is calculated every sliding operation, to thereby obtain the correlation values.

Furthermore, the thus-acquired correlation values are subjected to a so-called calculations of voltage averaging and power averaging, thereby being subjected to an averaging process. The averaging process is performed for the purpose of increasing an S/N ratio. The data, whose S/N ratio has been increased so as to attain low noise, are subjected to a so-called "target detection" process. In the target detection process, an attempt is made to identify a peak of the correlation values. When a peak is identified, a distance to a measuring subject (i.e., a target) is calculated and stored in a memory, thereby completing a ranging (distance measurement) sequence. The ranging sequence is repeated in a time sequence with respect to a pre-determined distance-determination range (i.e., 200 m).

The inventors evaluated a spread spectrum radar for performing the above-mentioned processes in the following method. That is, the evaluation method includes three steps of: (i) acquiring data obtained by performing the correlation calculation by means of a microcomputer; namely, detailed data (raw data); (ii) transferring the thus-acquired detailed data from the microcomputer to a computer (an evaluation device); and (iii) comparing the thus-transferred detailed data with data obtained by simulation by means of the computer to analyze performances and functions of the spread spectrum radar.

Meanwhile, when the spread spectrum radar is set to the "normal operation mode", the slide unit detection is repeated such that "detecting 1 slide unit"→"detecting 1 slide unit"→ . . . , while a pattern of the transmission code is shift in a time sequence manner by one bit at a time, to thereby execute the above-mentioned ranging sequence.

The inventors have found a problem that if the spread spectrum radar enters an evaluation mode during such a ranging sequence, the ranging sequence cannot be performed smoothly. The inventors also have found that this problem is resulted from the step (ii) in the above-mentioned method. The reason for the problem is as follows. An amount of detailed data obtained from the sliding correlation calculation performed in the step (i) is so large as to exceed a maximum transfer rate of a transfer bus from the microcomputer to the computer. As a result, data transfer becomes backlogged.

Meanwhile, in the "normal operation mode", the large amount of detailed data obtained from the sliding correlation calculation are subsequently averaged for every predetermined number of chips (bits) (and then, the data having been averaged are discarded). Thereafter, the thus-obtained average value is subjected to peak detection. Therefore, a problem that the large amount of data are backlogged so as to adversely affect a target detection process does not arise in the "normal operation mode".

Hence, in view of the above problem, the invention provides an evaluation method, which can smoothly transfer detailed data, which are dispensable for the "evaluation mode" even when a spread spectrum radar enters the "evaluation mode" in the middle of the "normal operation mode".

FIG. 1 is a diagram showing basic steps of an evaluation method according to one embodiment of the invention.

As shown in the drawing, the evaluation method according to one embodiment of the invention includes at least a first step S11 and a second step S12. The steps will be described further in detail below.

First, the method shown in FIG. 1 is presumed on that a spread spectrum radar performs a target detection process in a first mode (e.g. "normal operation mode"), wherein the target detection process includes performing a slide unit detection a plurality of times while sliding transmission code by predetermined number of chips (e.g., 1 chip (bit)); and the slide unit detection includes transmitting the transmission code and performing a sliding correlation calculation between the transmission code and a reception code. The method is one for evaluating such a spread spectrum radar.

In the first step S11, when the spread spectrum radar is changed to a second mode (e.g. "evaluation mode"), which is different from the first mode (e.g. "normal mode"), the evaluation method stops the slide unit detection to be performed subsequently to the slide unit detection being performed at a time of changing to the second mode.

In the second step S12, the evaluation method transfers data group that indicates sliding correlation values obtained in the slide unit detection being performed at the time of changing to the second mode. The method may transfers the data group to, e.g., an evaluation device.

In a third step S13, the evaluation device evaluates the spread spectrum radar. The evaluation device referred to here may be a device, which implements an evaluation according to the invention, namely, an evaluation device (or an evaluation system).

The evaluation method according to the invention can avoid a problem that a large amount of data group indicating the sliding correlation values cause data, which exceed a transfer capacity and having failed to be transferred to an evaluation device, to be backlogged, to thereby adversely affect an intended evaluation.

DETAILED DESCRIPTION OF THE PREFERRED EMBODIMENTS

To clarify effects provided by an embodiment of the invention, first, a spread spectrum radar will be described with reference to the drawings.

Figure 11:
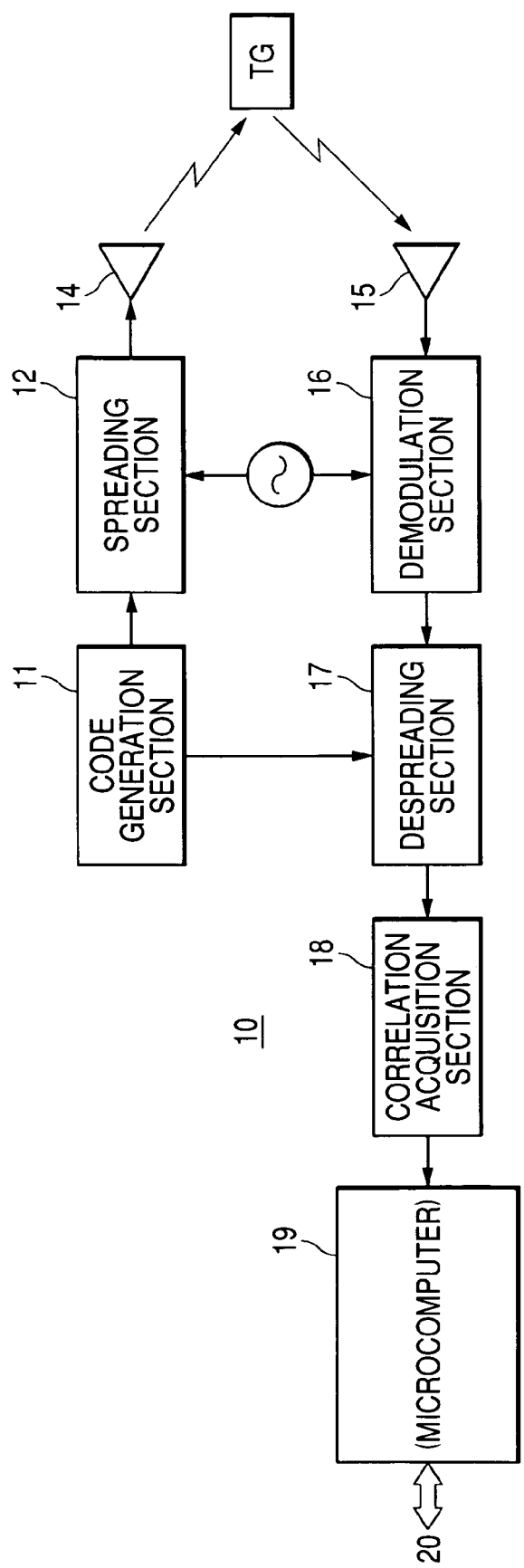
FIG. 11 is a block diagram showing a spread spectrum radar.

FIG. 11 is a block diagram showing a spread spectrum radar.

FIG. 11 shows that the spread spectrum radar 10 includes principal constitutional blocks 11 to 19.

First, a code generation section 11 generates a predetermined transmission code, and inputs the generated transmission code to a spreading section 12. The spreading section 12 modulates a carrier output from a carrier generation section 13 with the transmission code, and emits the thus-modulated transmission signal to a target TG, namely, toward a measuring subject, through a transmission antenna 14.

Meanwhile, at a receiving side of the radar 10, a receiving antenna 15 receives a reflected wave from the target TG. A demodulation section 16 down-converts the received signal with use of the carrier, and inputs the down-converted signal into a despreading section 17. The despreading section 17 despreads (multiplies) the received signal by the transmission code supplied from the code generation section 11, thereby obtaining a reception code.

Thereafter, the transmission code and the reception code are input to a correlation acquisition section 18. The correlation acquisition section 18 performs the sliding correlation calculation with respect to both of the transmission code and the reception code. At this time, the correlation acquisition section 18 shifts the transmission code by 1 bit (1 chip) every time, sequentially. Meanwhile, the transmission code referred to here implies a code having a length of a predetermined measuring distance (a measuring range) or longer.

The thus-obtained sliding correlation value is supplied to a target detection process section 19 at a subsequent stage. The target detection process section 19 performs A/D sampling operation and the above-described averaging process. Accordingly, the target detection process section 19 may be implemented by, for instance, a microcomputer. The evaluation method according to this embodiment is performed by an evaluation device, which contains a computer (PC) and operates in conjunction with the target detection process section 19.

Figure 2:
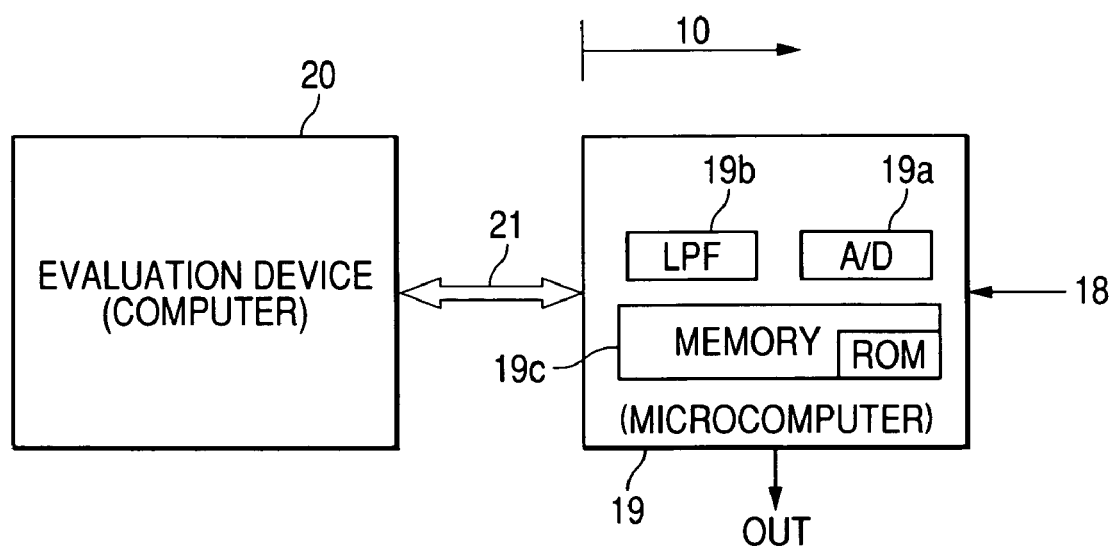
FIG. 2 is a diagram showing positioning of an evaluation device employed one embodiment of the invention.

FIG. 2 is a diagram showing positioning of the evaluation device according to this embodiment.

Reference numeral 20 denotes the evaluation device, which is connected to the target detection process section (microcomputer) 19 by way of a data transfer bus 21. An A/D sampling section 19a and an LPF (low pass filter) section 19b are provided in the microcomputer. A memory 19c are also built in the microcomputer. The LPF section 19b is used for the averaging process mentioned above. The averaging process will be described in more detail below. Meanwhile, an output "OUT" from the microcomputer 19 is utilized, for instance, for generating a collision warning alarm and/or in a cruise control system.

FIGS. 3A to 3E are diagrams showing a concept of processes performed by the target detection process section 19 in FIG. 2. In this embodiment, the processes obtains an average voltage for each duration corresponding to five sets of 200 chips (cp) (see FIG. 3C), and obtains average power for five sets of 500 slides (see FIG. 3B).

FIG. 3A shows a state where four ranging units (each ranging unit corresponding to "1 set") in the ranging sequence are in succession. In "1 set," a process pertaining to a predetermined distance-determination range (i.e., a range from 0 to 200 m) is performed, and the process pertaining to the distance-determination range is repeated.

FIG. 3B shows an enlarged view of 1 unit of the distance-determination range, in which five sets of "500 slides" each are in succession. With using the five sets of "500 slides", further noise rejection is performed in addition to averaging of voltages, which will be described later.

FIG. 3C shows an enlarged and developed view of a single unit of "500 slides". "1 slide," which is one of the "500 slides," includes five continuous sets of 200 chips (cp), that is, 1,000 (=5×200) chips (cp) in total.

A correlation value corresponding to 200 chips is subjected to sampling each time in accordance with an A/D sampling timing (1) shown in FIG. 3D; and five sampling are performed with respect to "1 slide". Subsequently, the previously-described transmission code is shifted by 1 bit (i.e., 1 cp), and the next "1 slide" starts in a similar manner as above and then, is shifted by another 1 bit (1 cp). When a 500th slide is completed, the calculation is completed. The above describes the sliding correlation calculation. For noise rejection (for increasing the S/N ratio), the LPF section 19b (FIG. 2) calculates an average of voltages of each "1 slide" in accordance with an A/D sampling timing (2) shown in FIG. 3E.

It is assumed that 1 cp shown in FIG. 3C corresponds to, for instance, 10 cm in actual distance, 500 slides corresponds to 50 m (=500×10 cm); and "1 set" shown in FIG. 3A corresponds to 250 m (=50 m×5).

When, for the sake of simplicity, a target TG is assumed to be present 5 cm ahead (i.e., 10 cm for going and returning), a sliding correlation value of second "1 slide" (that is, "1 slide"

appears in the second portion of FIG. 3C) shows a peak. An example of a correlation characteristic is shown in a graph as follows.

Figure 4:
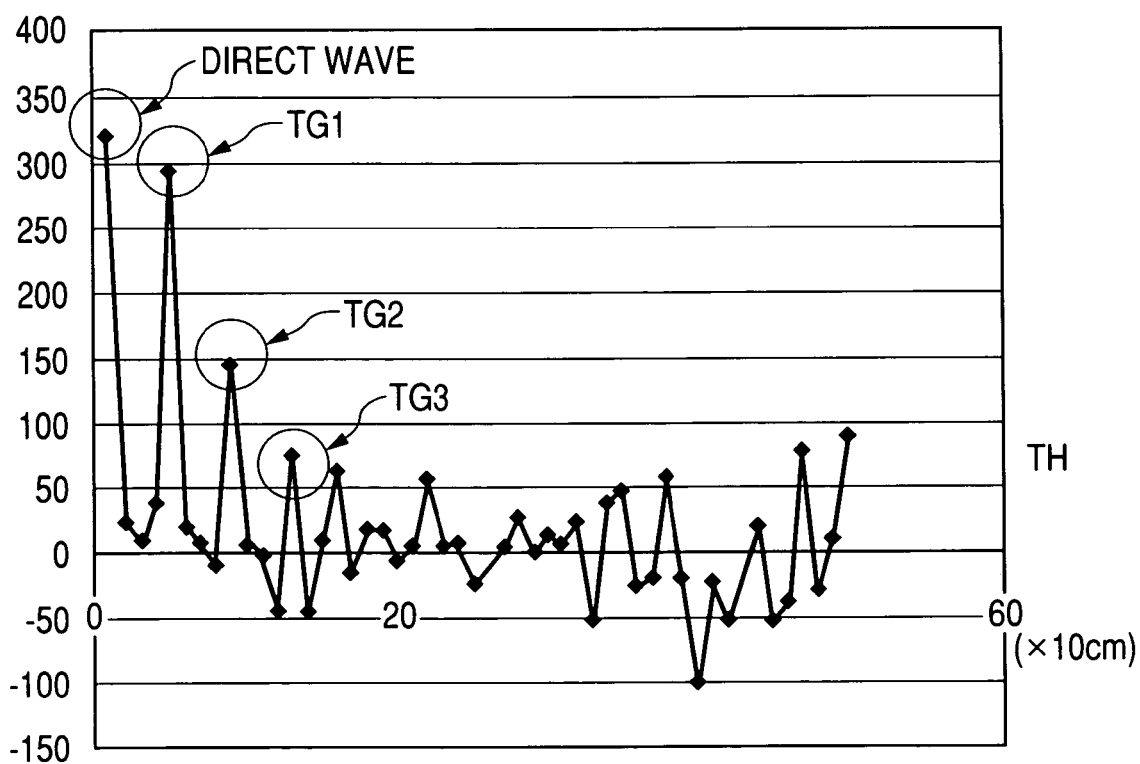
FIG. 4 is a graph showing an example of a correlation characteristic.

FIG. 4 is a graph showing an example of a correlation characteristic. The ordinate denotes a sliding correlation value, and an abscissa denotes a distance to the target TG.

The example in the graph shows four peaks exceeding a correlation value threshold TH. More specifically, in addition to the peak on the leftmost due to a direct wave, the graph shows that three peaks, that is, targets (TG1, TG2, and TG3), are present at the corresponding distances.

Figure 5:
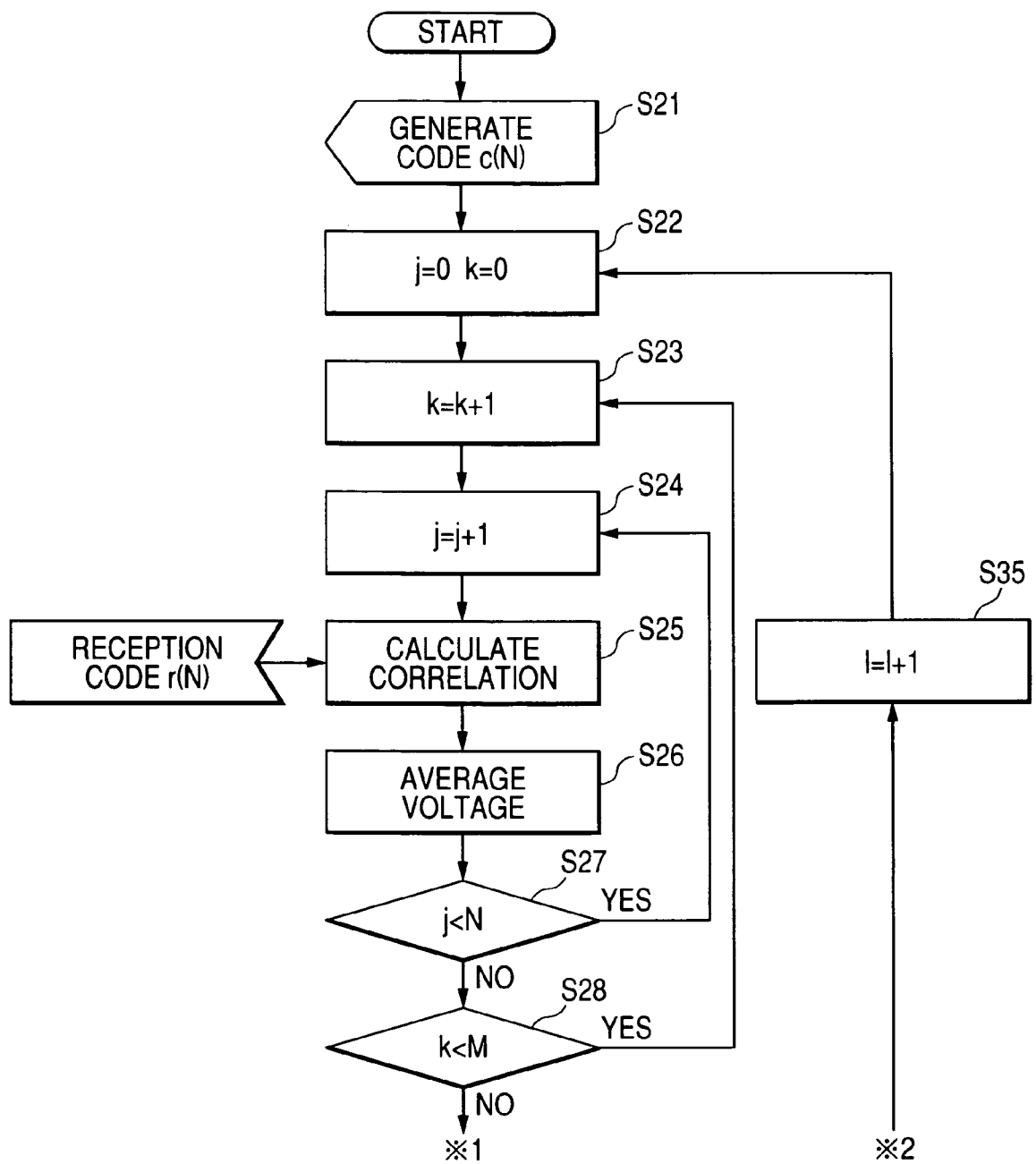
FIG. 5 is a flowchart in a normal operation mode (part 1)
Figure 6:
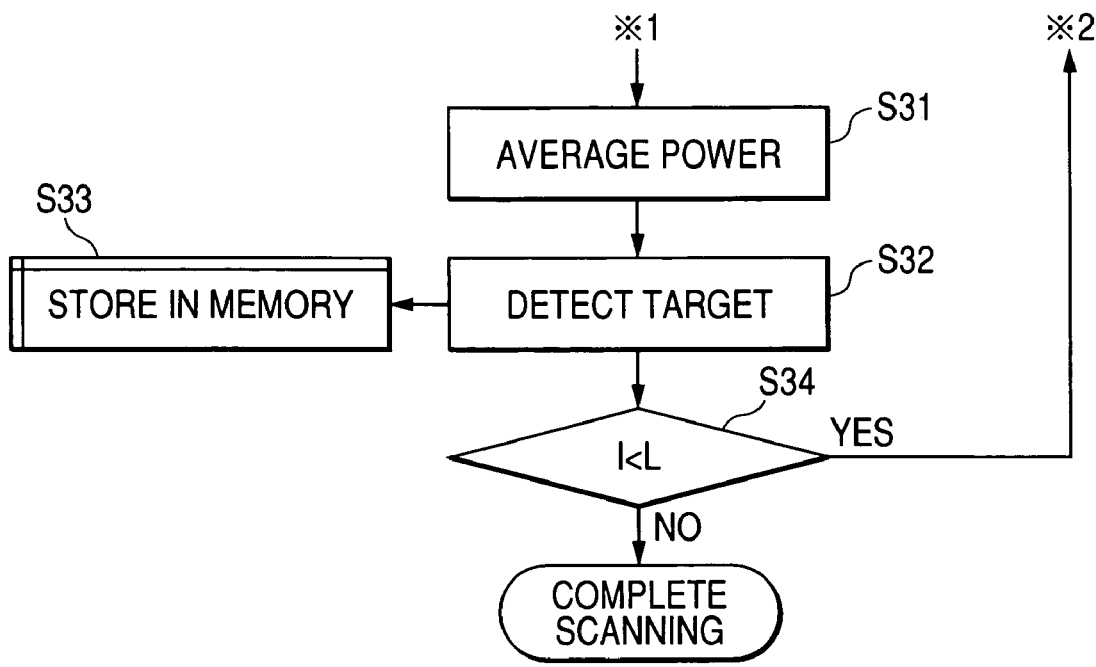
FIG. 6 is another flowchart in the normal operation mode (part 2)

The overview of the sliding correlation calculation has been described with reference to FIG. 3A to 3E and FIG. 4. FIGS. 5 and 6 show the same in a form of a flowchart.

FIG. 5 shows a flowchart in the normal operation mode (part 1) FIG. 6 shows another flowchart of the same (part 2).

The code generation section 11 outputs a transmission code c(N) (step S21). In the example shown in FIGS. 3A to 3E, N equals 500, which corresponds to 500 slides in FIG. 3C.

Initial values of "j" and "k" are set in step S22 (that is, "j" and "k" are set to 0). Then, "j" is counted up in increments of 1 (step S24). The count-up is continued until "j" exceeds 500 (i.e., when NO is selected in step S27).

After "j" is counted up in increments of 1 as described above, the sliding correlation calculation between the transmission code c(N) and a reception code r(N) is performed (step S25), and a process of power averaging (step S26) are performed. The processes performed in the steps S25 and S26 correspond to FIG. 3C in the example shown in FIG. 3.

The above operation is repeated, according to the example of FIG. 3B, five times (steps S28 and S23), thereby performing the power averaging. The five times corresponds to setting M in step S28 as "M=5."

Thus, the power averaging is completed (step S31, FIG. 6). Subsequently, peaks of the correlation values shown in FIG. 4 are searched. This process corresponds to the target detection (step S32). A result of the target detection is stored in a memory (step S33). The memory is the memory 19c shown in FIG. 2.

Furthermore, according to the example shown in FIG. 3A, "1 set" is repeated four times ("L=4" in step S34). If l is less than L in step S34 (that is, Yes in step S34), l is counted up in increments of 1 and the process goes back to step S22.

Next, the evaluation mode by means of the evaluation device 20 (FIG. 2) will be described. As previously described with reference to FIG. 1, the evaluation method according to this embodiment includes the two basic steps. In the first step, when the spread spectrum radar 10 is changed to the "evaluation mode"), which is different from the "normal mode", the evaluation method stops the slide unit detection to be performed subsequently to the slide unit detection being performed at a time of changing to the second mode. In the second step S12, the evaluation method transfers to the evaluation device 20 data group that indicates sliding correlation values obtained in the slide unit detection being performed at the time of changing to the second mode.

Figure 7:
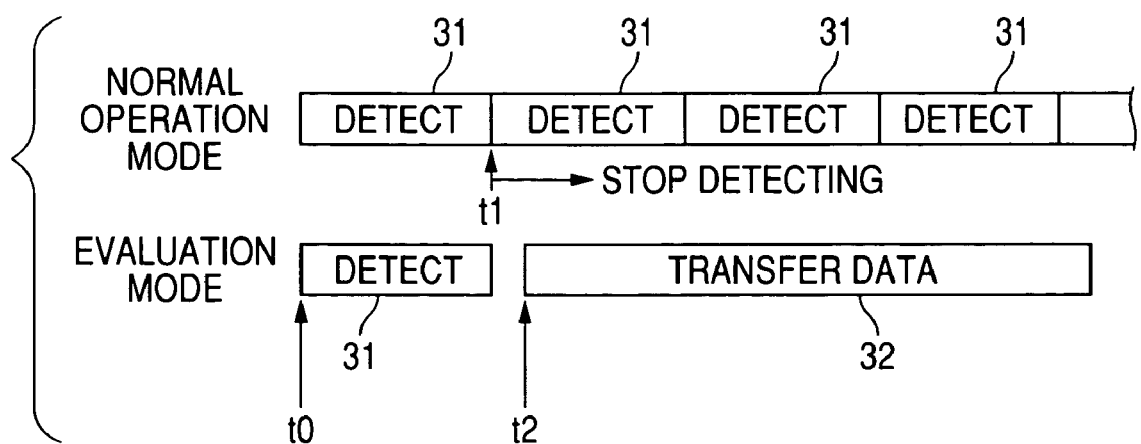
FIG. 7 is a diagram for explaining steps in FIG. 1 in a diagrammatic manner.

With reference to FIGS. 3A to 3E, the "slide unit detection" referred to here corresponds to detection (the sliding correlation calculation and power averaging process) of "1 slide" in FIG. 3C. In particular, digital data sets of every 200 cp duration, which have been obtained at the A/D sampling timing (1) in FIG. 3D, are important as detailed data (raw data) for the evaluation device 20. However, even one data set of 200 cp has a considerable amount of data in consideration that one chip is of, for instance, the order of 1 Giga bps. Therefore, as described above, the data cause a bottleneck in the data transfer bus 21. As a result, data transfer becomes backlogged, thereby adversely affecting smooth evaluation. This problem has been solved by the first step S11 and the second step S12. FIG. 7 shows the steps S11 and S12 in a diagrammatic manner.

Figure 1:
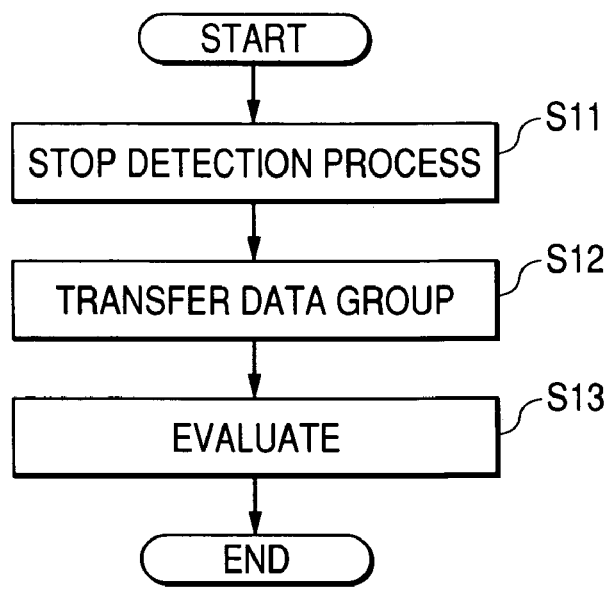
FIG. 1 is a diagram showing basic steps of an evaluation method according to the invention.

FIG. 7 is a diagram for explaining the steps in FIG. 1 in a diagrammatic manner.

The upper figure corresponds to the normal operation mode, and the lower figure corresponds to the evaluation mode.

Figure 8:
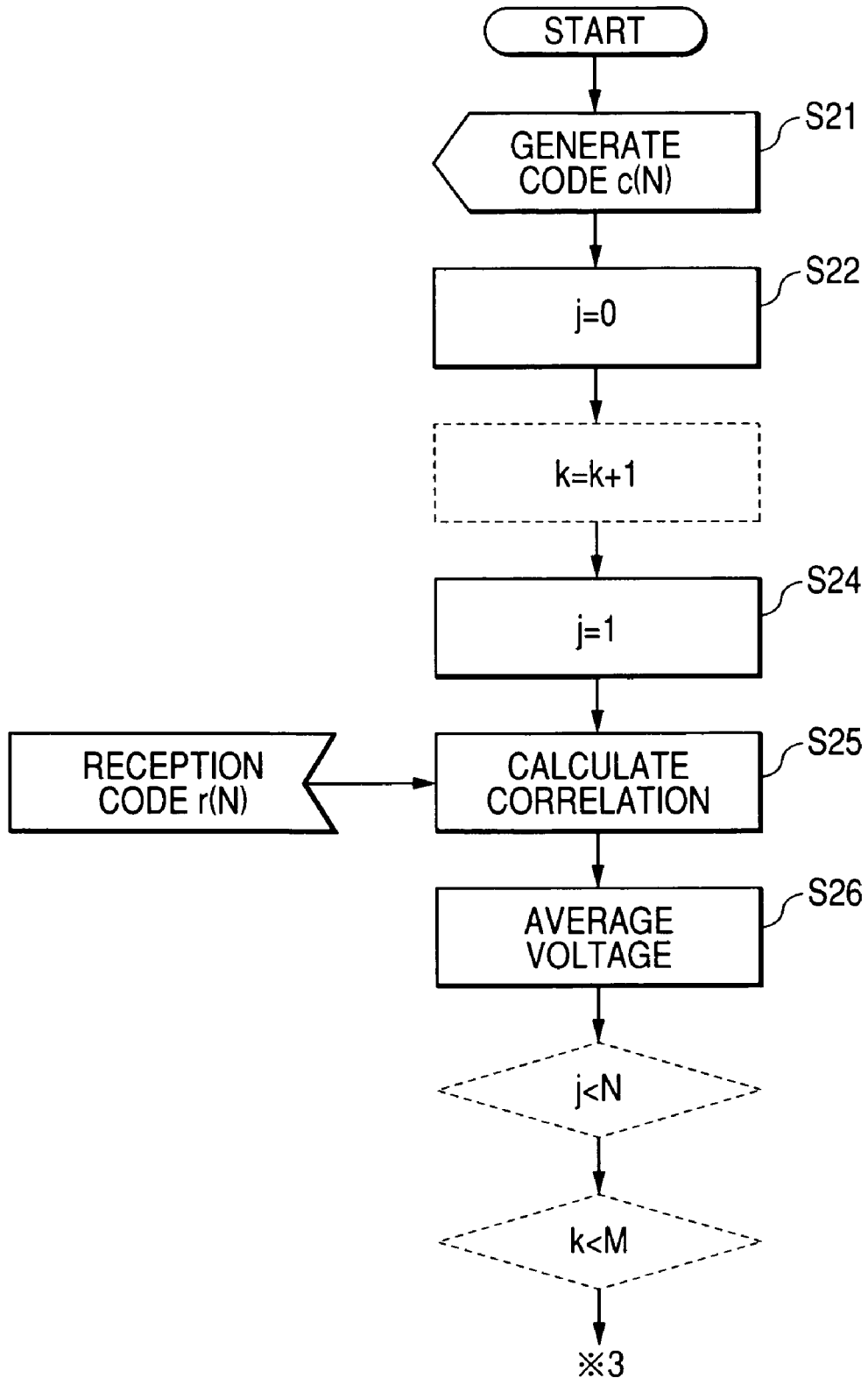
FIG. 8 is a flowchart in an evaluation mode (part 1)
Figure 9:
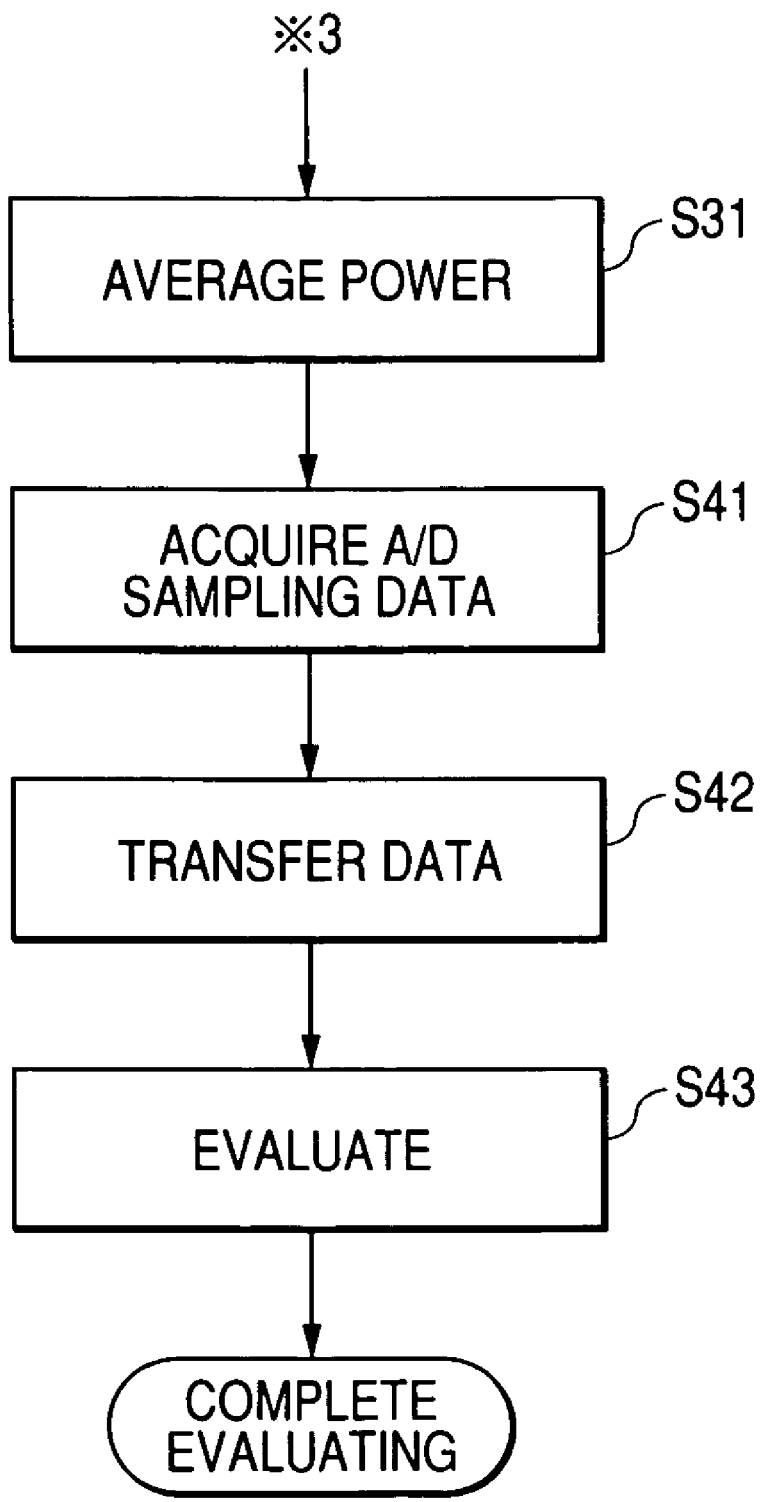
FIG. 9 is another flowchart in the evaluation mode (part 2)

For instance, when the evaluation device (computer) 20 gives an evaluation mode initiating command to the target detection process section (microcomputer) 19 at a time t0, the "slide unit detection" 31 having been repeated is stopped from a time t1, which is subsequent to t0. The detailed data (raw data) having been stored in the microcomputer 19 are sent to the computer 20 during the above period (t0→t1) by way of the data transfer bus 21 after a time t2 (a "data transfer" 32). The microcomputer 19 prepares for start of data transfer during time period of t1→t2. Meanwhile, the detailed data in the microcomputer 19 may be accumulated in a predetermined area of the memory 19c (FIG. 2). The transfer of a large amount of data is performed during a period in which the slide unit detection having been to be performed is stopped (i.e., a "detection-stop" period). If generation of the transmission code is stopped at, for instance, c(34) in FIG. 5, generation of the transmission code is restarted from c(35) after completion of the data transfer 32. FIGS. 8 and 9 show the above-described process flow in the similar manner as illustrated in FIGS. 5 and 6.

FIG. 8 shows a flowchart in the evaluation mode (part 1), and FIG. 9 shows another flowchart of the same (part 2).

FIG. 8 differs from FIG. 5 in that step S24 is changed to "j=1", and steps S23, S27, S28, and S35 are eliminated.

In FIG. 9, steps S41, S42, and S43 are performed in place of steps S32, S33, and S34 in FIG. 6.

Figure 3:
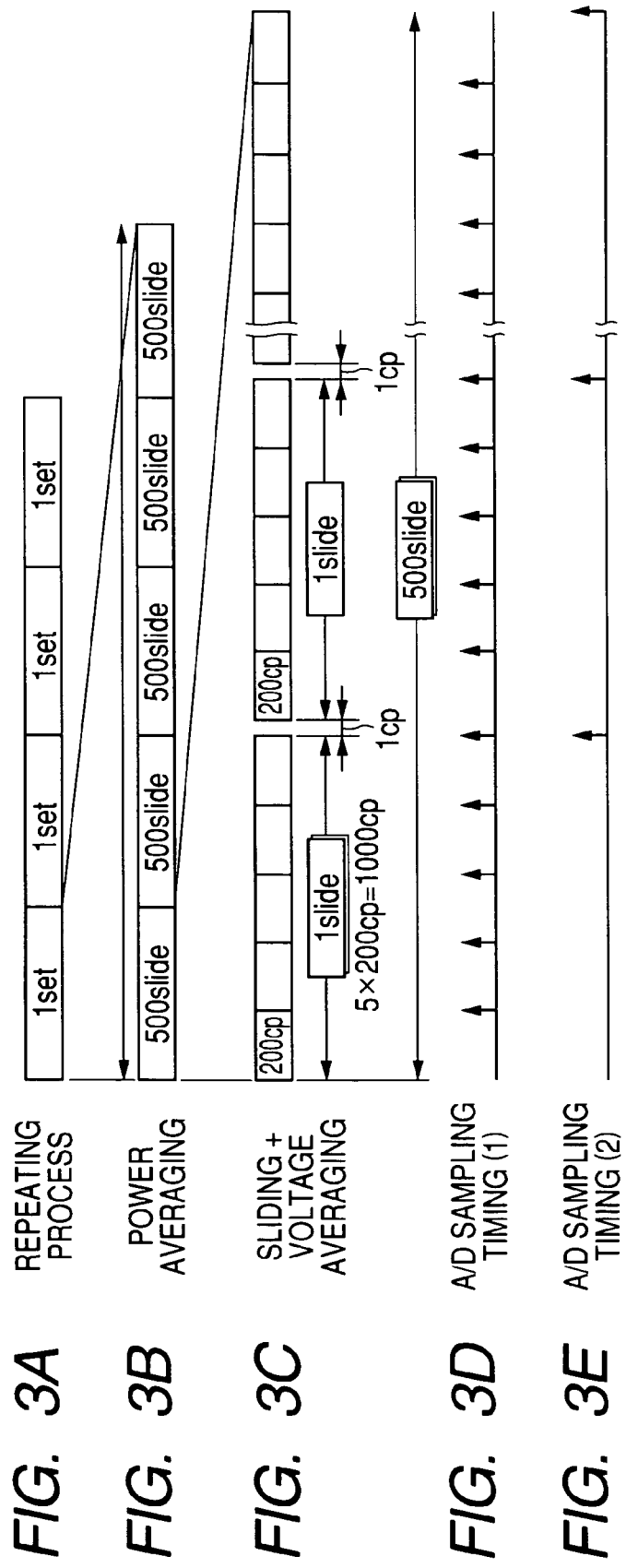
FIGS. 3A to 3E are diagrams showing a concept of a process performed by a target detection process section 19 shown in FIG. 2.

In step S41, A/D sampling data shown in FIGS. 3C and 3D are acquired. In step S42, the data transfer, which corresponds to step S12 in FIG. 1 and reference numeral 32 in FIG. 7, is performed. In step S43, evaluation and analysis, which are a primary purpose of this embodiment and are shown in step S13 in FIG. 1, are performed. If the series of the evaluation mode shown in FIGS. 8 and 9 is redrawn in a similar manner to FIG. 3, FIG. 10 is obtained.

Figure 10:
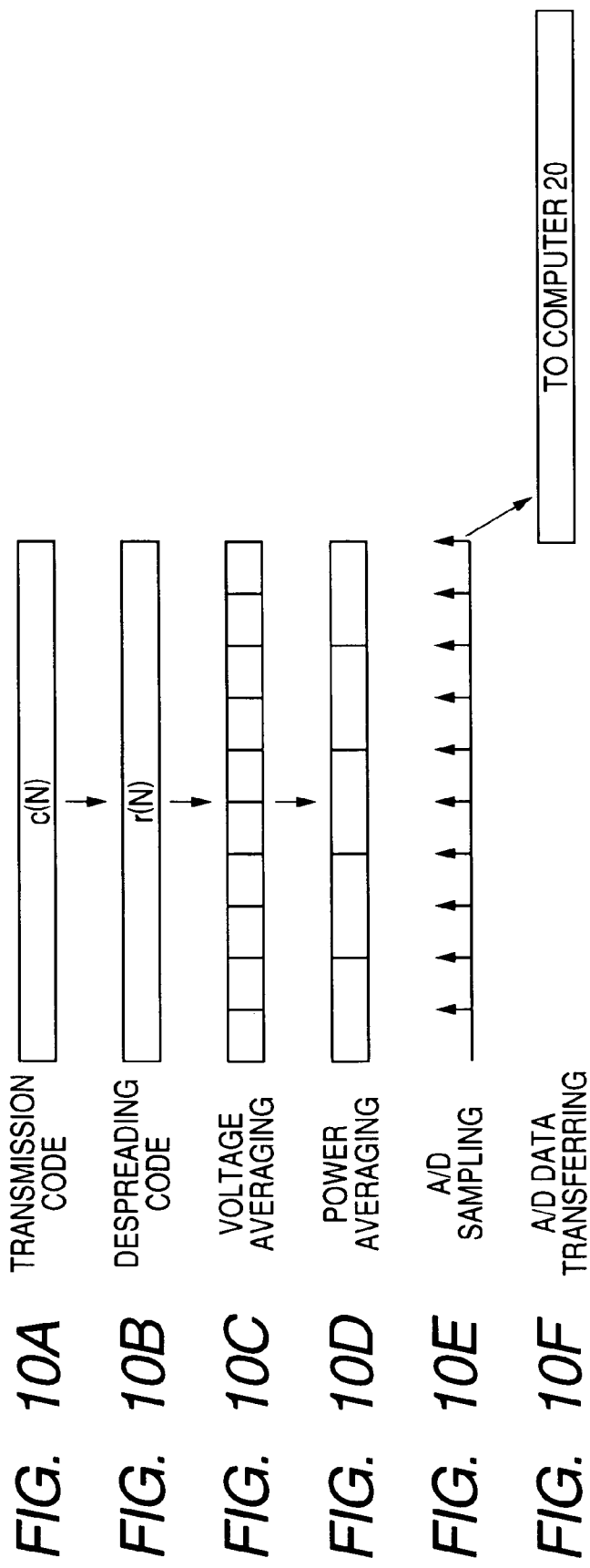
FIG. 10A to FIG. 10F is a diagram showing the evaluation mode according to one embodiment of the invention in a similar manner to FIG. 3.

FIG. 10 is a diagram showing the evaluation mode according to this embodiment in a similar manner to FIG. 3.

In FIG. 10A, a transmission code is generated;

in FIG. 10B, a despreading code is obtained, and a correlation value therebetween is calculated;

in FIG. 10C, a voltage thereof is averaged;

in FIG. 10D, additionally, a power thereof is averaged, whereby analog data whose noise has been reduced are obtained;

in FIG. 10E, the analog data are converted into corresponding digital data by means of A/D sampling, and stored in the memory; and in FIG. 10F, the accumulated data in the memory are transferred to the evaluation device (computer) 20 by way of the data transfer bus 21.

Meanwhile, in the above description, the sliding correlation value having been obtained during a single "slide unit detection" period is assumed as an object of the "data transfer." However, data group of sliding correlation values having been obtained during a plurality of continuous "slide unit detection" periods may be transferred. The plural "slide unit detection" periods may include the "slide unit detection"

period at the time of changing the "normal operation mode" to the "evaluation mode" and "slide unit detection" periods precedent thereto.

It is noted that number of slide unit detection periods may be determined within a range, which does not exceed a data amount allowable for the data transfer bus 21 at the time of data transfer from the microcomputer 19 to the computer 20.

Hithertofore, the evaluation method according to one embodiment of the invention has been described on the basis of a system where the microcomputer 19 and the computer 20 are combined. The invention may be applied to the microcomputer 19. Specifically, the invention may be applied to a program stored in the ROM of the microcomputer 19. The program includes a first program P1 and a second program P2, and the ROM of the microcomputer 19 stores these programs P1 and P2 together.

The first program P1 performs a target detection process in a first mode. The target detection process includes performing a slide unit detection a plurality of times while sliding transmission code by predetermined number of chips. The slide unit detection includes transmitting the transmission code and performing a sliding-correlation calculation between the transmission code and a reception code.

The second program P2 stops the slide unit detection to be performed subsequently to the slide unit detection being performed at a time of changing to a second mode, when the spread spectrum radar is changed to the second mode, which is different from the first mode; and transfers to outside of the radar data group that indicates sliding correlation values obtained in the slide unit detection being performed at the time of changing to the second mode.

Here, the first mode corresponds to the normal operation mode, and the second mode corresponds to the evaluation mode.

The invention can be applied not only to an evaluation test of a spread spectrum radar, but also to a case where a communication device of a direct spread communication system as disclosed in Japanese Patent No. 2580885 is evaluated and tested by means of an external device by way of a data transfer bus.

What is claimed is:

1. A method for evaluating a spread spectrum radar that performs a target detection process in a first mode, wherein the target detection process includes performing a slide unit detection a plurality of times while sliding a transmission code by a predetermined number of chips; and the slide unit detection includes transmitting the transmission code and performing a sliding correlation calculation between the transmission code and a reception code, the method comprising:

when the spread spectrum radar is changed to a second mode, which is different from the first mode, stopping the slide unit detection to be performed subsequently to the slide unit detection being performed at a time of changing to the second mode; and transferring a data group that indicates sliding correlation values obtained in the slide unit detection being performed at the time of changing to the second mode.

2. The method according to claim 1, wherein the data group transferred indicates sliding correlation values obtained in a plurality of slide unit detections including the slide unit detection being performed at the time of changing to the second mode.

3. The method according to claim 1, further comprising:

converting the sliding correlation values, which are analog values, into digital values at a predetermined A/D sampling timing to obtain a digital data group, wherein:

the data group transferred is the digital data group.

4. The method according to claim 2, further comprising:

converting the sliding correlation values, which are analog values, into digital values at a predetermined A/D sampling timing to obtain a digital data group, wherein:

the data group transferred is the digital data group.

5. The method according to claim 2, further comprising:

setting a number of the plurality of slide unit detections so that an amount of the data group transferred is less than an amount of data permissible in a transferring.

6. A spread spectrum radar comprising a computer readable medium storing a program that causes the spread spectrum radar to perform a process comprising:

performing a target detection process in a first mode, wherein the target detection process includes performing a slide unit detection plurality of times while sliding a transmission code by predetermined number of chips; and the slide unit detection includes transmitting the transmission code and performing a sliding-correlation calculation between the transmission code and a reception code;

when the spread spectrum radar is changed to a second mode, which is different from the first mode, stopping the slide unit detection to be performed subsequently to the slide unit detection being performed at a time of changing to the second mode; and transferring a data group that indicates sliding correlation values obtained in the slide unit detection being performed at the time of changing to the second mode.

* * * * *